Oct. 8, 1940.  A. T. THOMPSON  2,217,391
LIQUEFIER AND METHOD OF CARBONATING BEVERAGES
Filed Dec. 22, 1937 — 3 Sheets-Sheet 1
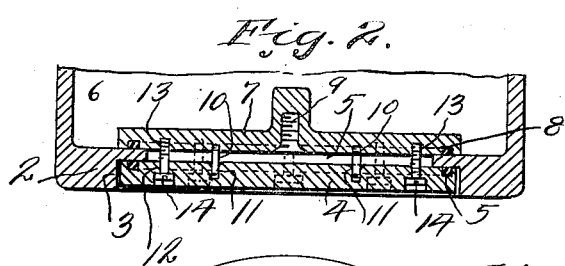
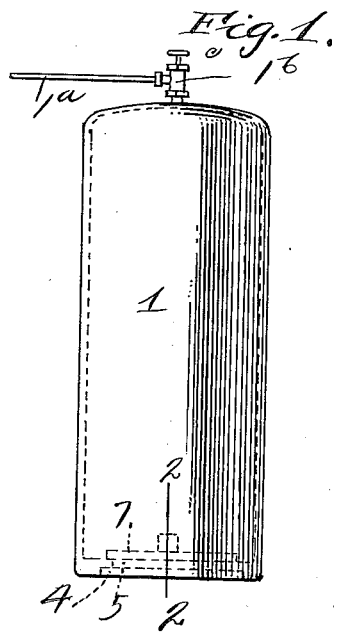
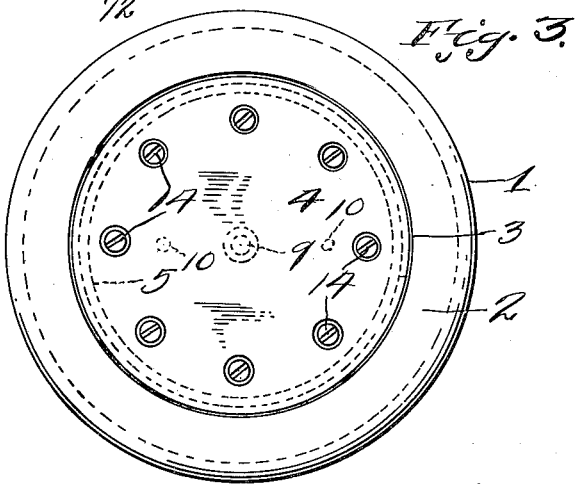
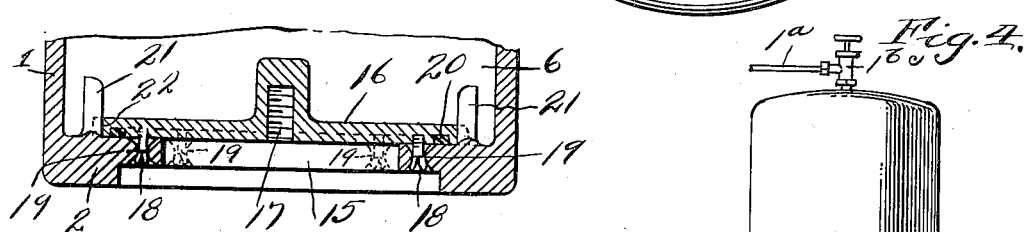
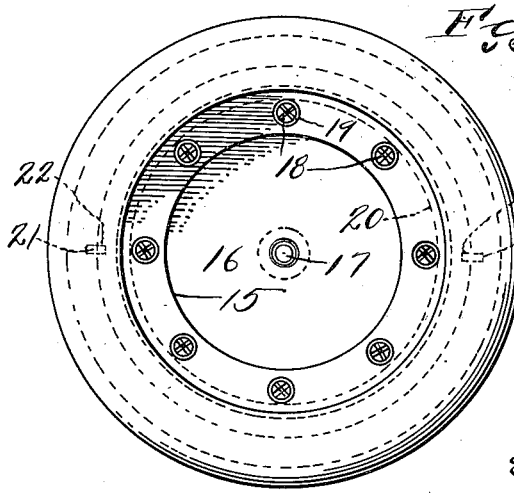
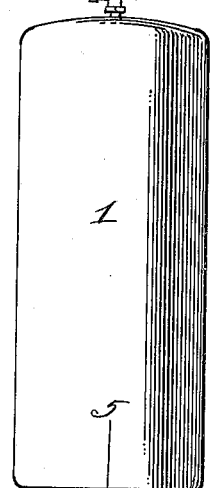
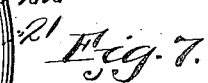
Inventor
Albert T. Thompson
By Philip A. H. Serrell
Attorney

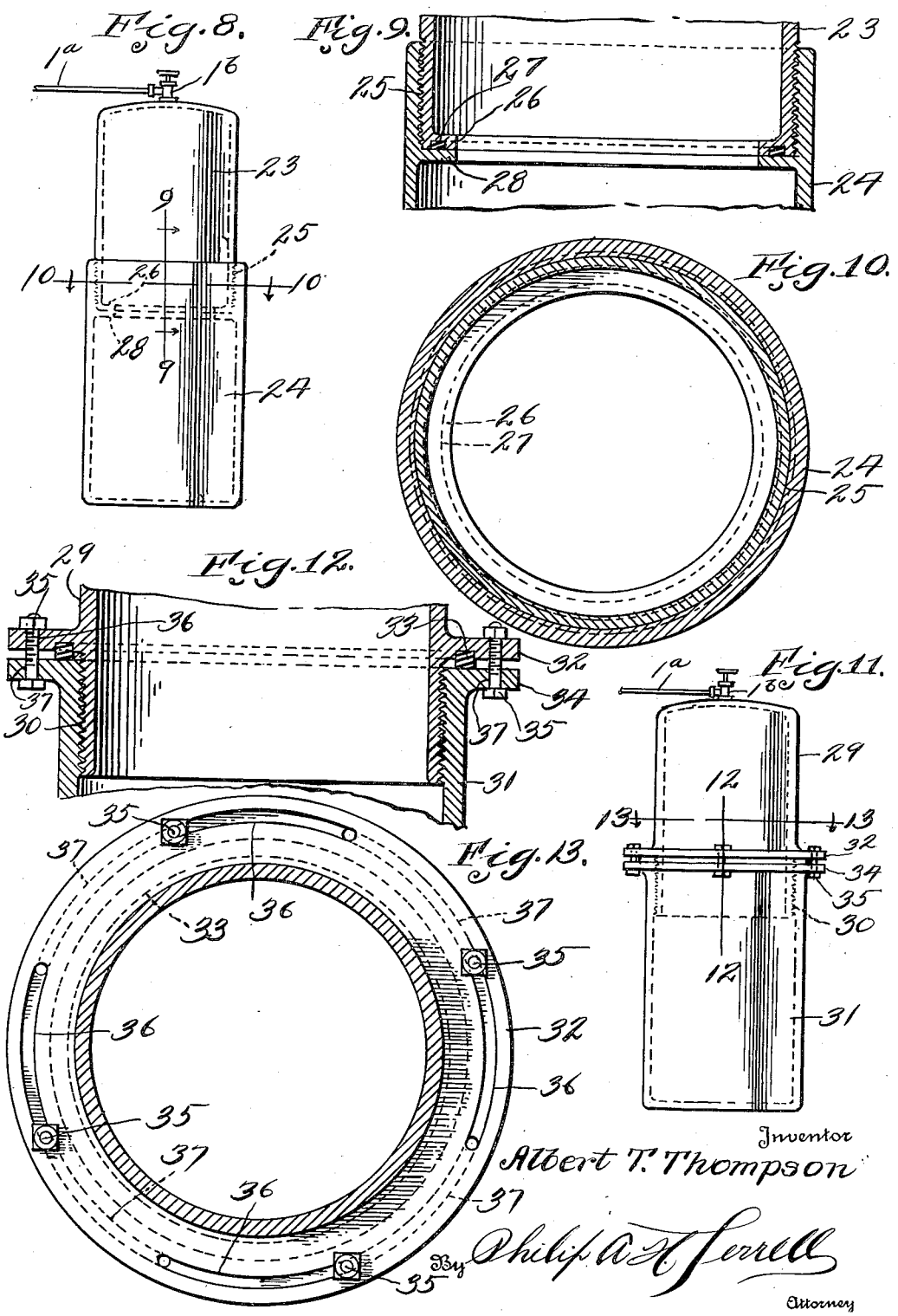

Oct. 8, 1940.  A. T. THOMPSON  2,217,391
LIQUEFIER AND METHOD OF CARBONATING BEVERAGES
Filed Dec. 22, 1937  3 Sheets-Sheet 3

Inventor
Albert T. Thompson
By Philip A. H. Serrell
Attorney

Patented Oct. 8, 1940

2,217,391

UNITED STATES PATENT OFFICE 2,217,391

LIQUEFIER AND METHOD OF CARBONATING BEVERAGES

Albert T. Thompson, New Orleans, La.

Application December 22, 1937, Serial No. 181,229

1 Claim. (Cl. 220—25)

The invention relates to liquefiers and method of carbonating beverages, and has for its object to provide a receptacle in which beverages, for instance soda water, may be carbonated and pre-mixed and delivered from the point of mixing to the point of dispensing, thereby obviating the present use of expensive machinery in soda water fountains and the like.

A further object is to provide a liquefying receptacle in which mixed beverages may be pre-mixed and then delivered and connected to the dispensing apparatus, thereby obviating the expensive and slow operation of mixing the beverages at the point of dispensing.

A further object is to provide a closure for the receptacle within the receptacle, and having spring headed lugs adapted to be snapped through apertures in the receptacle flange around the filling opening for forming a tight, leakproof connection, and holding the cover, as pressure is built up in the receptacle, for further forming a seal.

A further object is to provide guide means within the receptacle for the cover whereby the snap headed lugs will be guided into the apertures in the flange of the receptacle in axial relation, thereby insuring proper registry.

A further object is to provide a closure for the receptacle comprising inner and outer plates in registry with the filling opening and having guiding means in relation to each other, and securing bolts extending through said plates in registering apertures for drawing the plates together for forming a leakproof connection.

A further object is to provide a liquefier comprising chambered sections threaded together and having gasket means interposed between the sections and to the outside of the threaded connection, thereby preventing escape of gas which may pass through the threaded connection.

A further object is to provide a liquefier formed from upper and lower sections threaded together and gasket means between the sections to the inside of the threaded connection.

A further object is to provide a liquefier formed from threaded sections, one threaded into the other, and provided with annular flanges through concentric slots of which bolts are received for holding the sections against rotation in relation to each other after a tightening operation.

A further object is to proportion the concentric slots in both flanges whereby, no matter what position the sections assume, after a tightening operation, they will overlap for the reception of the bolts.

A further object is to provide the receptacle with a downwardly extending discharge pipe carried by the valve and assembled within the receptacle through the filling opening, and through which the contents of the receptacle is discharged by the gas pressure within the receptacle.

A further object is to form the discharge means within the receptacle from a plurality of detachable sections, thereby allowing the same to be disassembled and removed through the filling opening for cleaning and sterilizing purposes.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a view in elevation of the receptacle.

Figure 2 is a vertical transverse sectional view through the lower end of the receptacle taken on line 2—2 of Figure 1.

Figure 3 is a bottom plan view of the receptacle.

Figure 4 is a view in elevation of another type of receptacle.

Figure 5 is a vertical transverse sectional view through the lower end of the receptacle, taken on line 5—5 of Figure 4.

Figure 6 is a bottom plan view of the receptacle shown in Figure 4.

Figure 7 is a side elevation of one of the snap lugs.

Figure 8 is a view in elevation of a further form of receptacle showing the same formed from two chambered sections.

Figure 9 is a vertical transverse sectional view taken on line 9—9 of Figure 8.

Figure 10 is a horizontal sectional view taken on line 10—10 of Figure 8.

Figure 11 is a view in elevation of a further form of receptacle.

Figure 12 is a vertical transverse sectional view taken on line 12—12 of Figure 11.

Figure 13 is a horizontal sectional view taken on line 13—13 of Figure 11.

Figure 14:
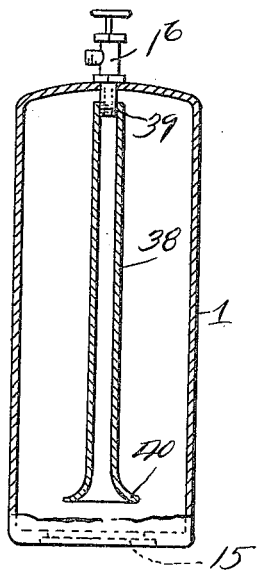
Figure 14 is a vertical transverse sectional view through a receptacle, showing a discharge pipe extending downwardly therein.

It is the present practice in soda water fountains and the like to mix each drink and carbonate the same when ordered. This involves time and machinery, and to obviate this difficulty and the use of machinery the containers are filled with the mixture at a central plant and carbonated by placing the carbon dioxide therein, and the containers delivered to drug stores and the like and attached to the dispensing piping for vending purposes in ready mixed form.

It is to be understood the containers may be placed in any convenient position, and the pressure generated within the container by the carbon dioxide, as it liquefies, will force the material in ready mixed form through the piping to the dispensing faucet.

Referring to the drawings, and particularly to Figures 1 to 3 inclusive, the numeral 1 designates the receptacle, which is sufficiently strong to withstand internal pressure when carbon dioxide is placed therein. The bottom 2 of the receptacle is provided with a rabbet 3, in which is disposed a plate 4 having a gasket 5, through which material is placed for mixing and storage purposes, and disposed within the chamber 6 of the receptacle is a closure plate 7 having a gasket 8, which engages the inner side of the bottom 2 around the filling opening. Plate 7 is preferably provided with a threaded aperture 9, in which a tool may be placed for handling the same. On the under side of plate 7, outwardly extending guide pins 10 are provided, which are received in apertures 11 in the plate 4 for holding the bolt apertures 12 and 13 in registry when the tightening bolts 14 are inserted and tightened for compressing the gaskets 8 and 5 against the opposite sides of the bottom 2 for forming a leakproof connection, and by providing two gaskets, a double sealing is obtained.

Referring to Figures 4 to 7 inclusive, the bottom 2, in this form, is provided with a filling opening 15 through which ingredients to be mixed and dispensed are passed. Disposed within the chamber 6 of the receptacle 1 is a closure plate 16 having a threaded opening 17 for the reception of a tool for vigorously forcing the closure plate towards the filling opening so the split headed lugs 18 will enter and pass through the flared apertures 19 in the bottom 2, as clearly shown in Figure 5, for holding the closure plate 16 in closed position with its gasket 20 in tight compressed engagement with the inner side of the bottom 2. During the snapping of the closure to closed position, the closure is guided on the arms 21, which extend into notches 22 thereof, hence it will be seen that the headed lugs will be in registry with the apertures 19 during the closing operation. When the receptacle is empty, and pressure relieved therein, closure 16 can be forced inwardly for disengaging the snap lugs from the apertures. The upper end of both receptacles is provided with discharge pipes 1a having a control valve 1b therein so the contents thereof may be dispensed.

Referring to Figures 8 to 18 inclusive, it will be seen that the receptacle is formed from an upper section 23 and a lower section 24, one of which is threaded into the other at 25.

The lower end of the upper section 23 is provided with an annular flange 26 having an annular gasket 27 therein on its outer side, and which gasket seats on an annular flange 28 within the upper end of the lower receptacle section 24, thereby forming a sealed connection between the sections so pressure within the receptacle will not be lost through the threaded connection 25, otherwise the operation of the device is the same as in the other forms.

Referring to Figures 11 to 13 inclusive, the upper section 29 of the receptacle is threaded at 30 into the upper end of the lower section 31. Section 29 is provided with an annular flange 32 spaced from its lower end and which flange carries an annular gasket 33 on its under side. The upper end of the receptacle section 31 is provided with an annular flange 34, adapted to be attached by means of bolts 35 to the upper flange section 32, hence it will be seen that after the threading operation and compressing the gasket 33, there is a positive sealing between the sections to the outside of the threaded connection 30, and should there be any leakage through the threaded connection 30, it will be stopped, by the gasket, from reaching the atmosphere.

As the compression on the gasket 13 will vary according to the wear of the gasket or the amount of power placed on the sections during the closing operation, it is obvious means should be provided for the bolts 35, which will register at any position for the reception of the bolts. To obtain this result the flange 32 is provided with spaced concentric slots 36, which are relatively elongated and the flange 34 with similar slots 37 in registry therewith. The slots 36 and 37 are sufficiently long whereby they will always overlap or register so the bolts will be received therethrough.

In Figures 14 to 18 inclusive is shown various types of discharge pipes carried by the valve nipple and extending downwardly into the receptacle and through which the contents of the receptacles is discharged when the valve 1b is opened.

Referring to Figure 14, in this form, the discharge pipe 38 is threaded at 39 on the valve and terminates in a flared portion 40 adjacent the lower end of the receptacle. It will be noted that the discharge pipe can be placed in the receptacle through the filling opening 15 and may be easily removed from the receptacle for cleaning and sterilizing purposes.

Figure 15:
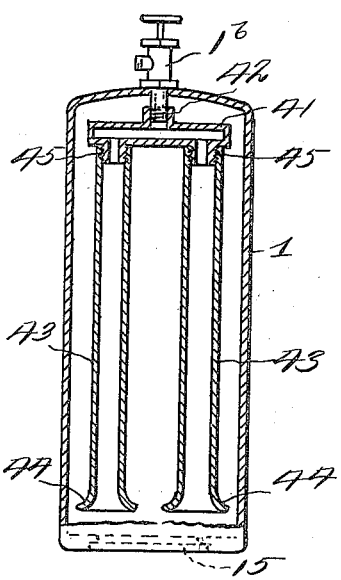
Figure 15 is a view similar to Figure 4 showing a plurality of discharge pipes.

Figure 15 shows a manifold 41 threaded at 42 on the valve nipple and is provided with depending pipes 43 terminating in flared portions 44. The pipes are detachably connected at 45 to the manifold so the pipe structure may be disassembled and removed from the receptacle through the filling opening 15.

Figure 16:
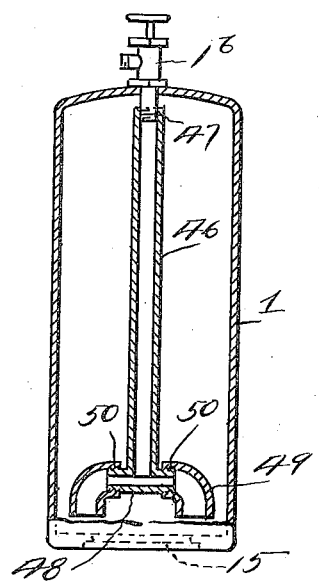
Figure 16 is a view similar to Figure 14, but showing branch pipes in connection with the discharge pipe.

Referring to Figure 16, in this form, the depending discharge pipe 46 is detachably connected at 47 to the valve 1b, and terminates at its lower end in a transverse branch pipe 48 having elbows 49 thereon, which are in turn detachably connected at 50 to the branch pipe 48. It will be seen that the discharge pipe may be disassembled and removed through the filling opening 15. In the forms shown in Figures 15 and 16 a larger discharge area is provided, and to the sides of the chamber to insure a mingling of the material as it is forced through the pipe 16.

Figure 17:
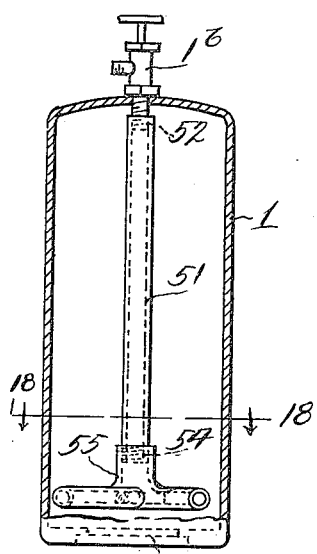
Figure 17 is a view similar to Figure 14, but showing radial and concentrically arranged discharge pipes.
Figure 18:
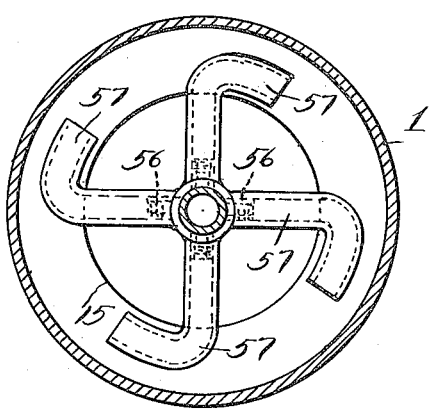
Figure 18 is a horizontal sectional view taken on line 18—18 of Figure 17.

Referring to Figures 17 and 18, in this form a discharge pipe 51 is detachably connected at 52 to the valve 1b and has detachably connected at 54, to the lower end thereof, a discharge head 55, to the branches of which are detachably connected at 56 radially and circumferentially extending intake pipes 57, and through which the contents of the receptacle is forced by the expanding gases within the receptacle, acting on the liquid body, the pressure and outflow of fluid will cause an inrush of the liquid and form turbulences for mixing the material. By disassembling the parts of the discharge pipe system they may be easily removed through the filling opening for cleaning and sterilizing purposes.

From the above it will be seen that a storage and dispensing receptacle is provided which can be thoroughly sterilized, which is not the case with beverage receptacles as at present used. Bottlers or producers of carbonated beverages usually thoroughly sterilize each bottle, yet, on the other hand the carbonic gas which they use for carbonating purposes in each sterilized bottle comes from a drum that in itself is not sterilized after each other. It will also be seen that a storage receptacle is provided for high pressure beverage material, and one which may be filled at a source of supply and transported to a place of dispensing so the contents thereof may be discharged in mixed form by its contained pressure.

It will also be seen that a receptacle is provided which is simple in construction, and one wherein there is a positive sealing of the parts, thereby preventing leakage and loss of pressure within the container.

The invention having been set forth what is claimed as new and useful is:

The combination with a filling opening of a receptacle, an annular rabbet in said filling opening forming a plate engaging flange, a closure for said filling opening within the receptacle, a closure for said filling opening outside the receptacle and entirely within the filling opening and rabbet, bolt receiving apertures in said closures in registry with each other, spaced interengaging means carried by the closure and plate for axially guiding said closures when assembled so said apertures will register, gaskets carried by said closures and engaging the receptacle around the filling opening, and bolts extending through said apertures and forming means whereby said closures may be forced towards each other and the gaskets compressed for forming a sealing connection between the receptacle and the closures.

ALBERT T. THOMPSON.